US010391931B2

(12) United States Patent
Shmueli Friedland et al.

(10) Patent No.: US 10,391,931 B2
(45) Date of Patent: Aug. 27, 2019

(54) SYSTEM AND METHOD FOR PROVIDING ENHANCED PASSENGER USE OF AN AUTONOMOUS VEHICLE

(71) Applicant: GM GLOBAL TECHNOLOGY OPERATIONS LLC, Detroit, MI (US)

(72) Inventors: Yael Shmueli Friedland, Tel Aviv (IL); Asaf Degani, Tel Aviv (IL); Gila Kamhi, Zichron Yaakov (IL); Ori Succary, Ramat Gan (IL); Jakie Shemesh, London (GB)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 15/620,401

(22) Filed: Jun. 12, 2017

(65) Prior Publication Data

US 2018/0354411 A1 Dec. 13, 2018

(51) Int. Cl.

| | |
|---|---|
| ***B60Q 1/32*** | (2006.01) |
| ***B60Q 1/26*** | (2006.01) |
| ***G01C 21/36*** | (2006.01) |
| ***G05D 1/02*** | (2006.01) |
| ***B60W 50/00*** | (2006.01) |
| ***B60Q 9/00*** | (2006.01) |
| ***G01C 21/34*** | (2006.01) |

(52) U.S. Cl.

CPC ............ *B60Q 1/323* (2013.01); *B60Q 1/2611* (2013.01); *B60Q 1/2615* (2013.01); *B60Q 1/2669* (2013.01); *B60Q 9/00* (2013.01); *B60W 50/00* (2013.01); *G01C 21/362* (2013.01); *G05D 1/0212* (2013.01); *G05D 1/0246* (2013.01); *G05D 1/0278* (2013.01); *B60Q 2400/20* (2013.01); *B60Q 2400/40* (2013.01); *G01C 21/3438* (2013.01); *G05D 2201/0212* (2013.01); *G05D 2201/0213* (2013.01)

(58) Field of Classification Search

CPC .... B60Q 1/323; B60Q 1/2611; B60Q 1/2615; B60Q 1/2669; G01C 21/3438; G01C 21/362; G05D 1/0212; G05D 1/0246; G05D 1/0278

See application file for complete search history.

(56) References Cited

U.S. PATENT DOCUMENTS 5,574,426 A * 11/1996 Shisgal .................. B60Q 9/007 180/271
8,593,521 B2 * 11/2013 Schofield ........... G06K 9/00818 348/148
9,497,500 B1 * 11/2016 Robinson ............. H04N 21/812
(Continued)

*Primary Examiner* — Behrang Badii
*Assistant Examiner* — Daniel L Greene
(74) *Attorney, Agent, or Firm* — Lorenz & Kopf LLP

(57) ABSTRACT

Methods are provided for managing a passenger's interaction with an autonomous vehicle. The method identifies a passenger approaching an autonomous vehicle and activates a recognition signal that indicates pairing the passenger with the vehicle. As the passenger approaches, and entry point for the vehicle is identified. A recognition signal for the entry point is activated and the passenger is notified. As the exit point for the bride approaches, it is identified by the vehicle and in exit indicator is activated for the passenger. Any exit obstacles are identified by the vehicle and the passenger is notified. And exit indicator is activated for the passenger to provide notification of a safe to exit status from the autonomous vehicle.

20 Claims, 9 Drawing Sheets

DROP OFF FLOW
110 Vehicle
112 Passenger
Identify Exit Point for Passenger 114
Notify Passenger of Approaching Exit 116
Activate Vehicle's Approaching Exit Indicator 118
Identify Exit Obstacles for Passenger 120
Notify Passenger of Exit Obstacle 122
Activate Vehicle's Exit Indicator 124
Notify Passenger of Safe to Exit 126

(56) References Cited

U.S. PATENT DOCUMENTS

| | | | | |
|---|---|---|---|---|
| 9,665,101 | B1 * | 5/2017 | Templeton | G05D 1/0272 |
| 9,784,839 | B2 * | 10/2017 | Graf | B60Q 1/0023 |
| 10,053,088 | B1 * | 8/2018 | Askeland | B60K 31/0008 |
| 2002/0105432 | A1 * | 8/2002 | Pederson | B60Q 1/2611 340/815.45 |
| 2002/0164962 | A1 * | 11/2002 | Mankins | A61K 38/2221 455/99 |
| 2005/0153707 | A1 * | 7/2005 | Ledyard | G01S 5/0018 455/456.1 |
| 2008/0122606 | A1 * | 5/2008 | Bradley | B60Q 1/0017 340/468 |
| 2010/0208485 | A1 * | 8/2010 | Morgans | B60Q 1/326 362/549 |
| 2010/0295670 | A1 * | 11/2010 | Sato | B60Q 9/00 340/458 |
| 2012/0062743 | A1 * | 3/2012 | Lynam | B60Q 9/005 348/148 |
| 2014/0118222 | A1 * | 5/2014 | Barrett | G01C 21/3688 345/2.2 |
| 2015/0339928 | A1 * | 11/2015 | Ramanujam | G08G 1/202 701/23 |
| 2015/0346722 | A1 * | 12/2015 | Herz | G05D 1/0038 701/2 |
| 2015/0369618 | A1 * | 12/2015 | Barnard | H05B 37/0272 701/491 |
| 2016/0284217 | A1 * | 9/2016 | Lee | G08G 1/143 |
| 2017/0052543 | A1 * | 2/2017 | Cherepinsky | G05D 1/101 |
| 2018/0130347 | A1 * | 5/2018 | Ricci | B60R 25/2018 |
| 2018/0201187 | A1 * | 7/2018 | Yellambalase | E05B 81/56 |

* cited by examiner

LED OPERATION DURING PICK UP FLOW

LED OPERATION DURING DROP OFF FLOW

300

SYSTEM AND METHOD FOR PROVIDING ENHANCED PASSENGER USE OF AN AUTONOMOUS VEHICLE

INTRODUCTION

An autonomous vehicle is a vehicle that is capable of sensing its environment and navigating with little or no user input. An autonomous vehicle senses its environment using sensing devices such as RADAR, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

For a passenger in an autonomous vehicle without a driver, the experience is potentially negative due to the sense of isolation. Additionally, locating a meeting point between an autonomous ridesharing vehicle such as a taxi and a passenger may be difficult for both entities. Solutions that rely on representations on a map are intended to minimize ambiguity but are prone to errors in identification.

Accordingly, it is also desirable to provide systems and methods that provide an enhanced passenger use and experience of an autonomous vehicle such as providing a user of an autonomous vehicle and unambiguous way of identification of the vehicle prior to use. Furthermore, other desirable features and characteristics of the present invention will become apparent from the subsequent detailed description and the appended claims, taken in conjunction with the accompanying drawings and the foregoing technical field and background.

SUMMARY

A method is provided for managing a passenger's interaction with an autonomous vehicle. The method comprises: identifying the passenger approaching the autonomous vehicle with a sensor onboard the autonomous vehicle; activating a recognition indicator for the autonomous vehicle; notifying the passenger of a vehicle pairing; identifying an entry point on the autonomous vehicle for the passenger; activating an indicator of the entry point on the autonomous vehicle; notifying the passenger of the entry point; identifying an approaching exit point for the passenger from the autonomous vehicle; activating an approaching exit indicator for the autonomous vehicle; identifying exit obstacles for the passenger with a sensor onboard the autonomous vehicle; notifying the passenger of any exit obstacles; activating the exit indicator for the autonomous vehicle; and notifying the passenger of safe to exit status for the autonomous vehicle.

In other embodiments, a method is provided for managing a passenger's interaction with an autonomous vehicle, comprising: identifying the passenger with a sensor onboard the autonomous vehicle; determining an appropriate recognition indicator for an external LED lighting system to identify the autonomous vehicle for the passenger; selecting an optimum vehicle entry point for the passenger based on the presence of any entry obstacles in proximity to the vehicle; selecting an optimum vehicle exit point for the passenger based on the presence of an exit obstacle in proximity to the vehicle; and illuminating the exit obstacle with the external LED lighting system for the passenger upon exiting the vehicle.

In other embodiments, a system is provided for managing a passenger's interactions with an autonomous vehicle, comprising: an autonomous driving system for the autonomous vehicle comprising a vehicle system processor and controller; a plurality of sensors that collect data regarding the conditions affecting the passenger's interactions with the autonomous vehicle, where the data is provided to the vehicle system's processor and controller; a passenger management system that receives the data from the vehicle system processor and controller, where the passenger management system analyzes the data and determines an optimum interaction between the autonomous vehicle and the passenger; and a passenger interface system that receives instructions from the passenger management system and initiates communications with the passenger.

BRIEF DESCRIPTION OF THE DRAWINGS

The present invention will hereinafter be described in conjunction with the following drawing figures, wherein like numerals denote like elements.

Figure 7:
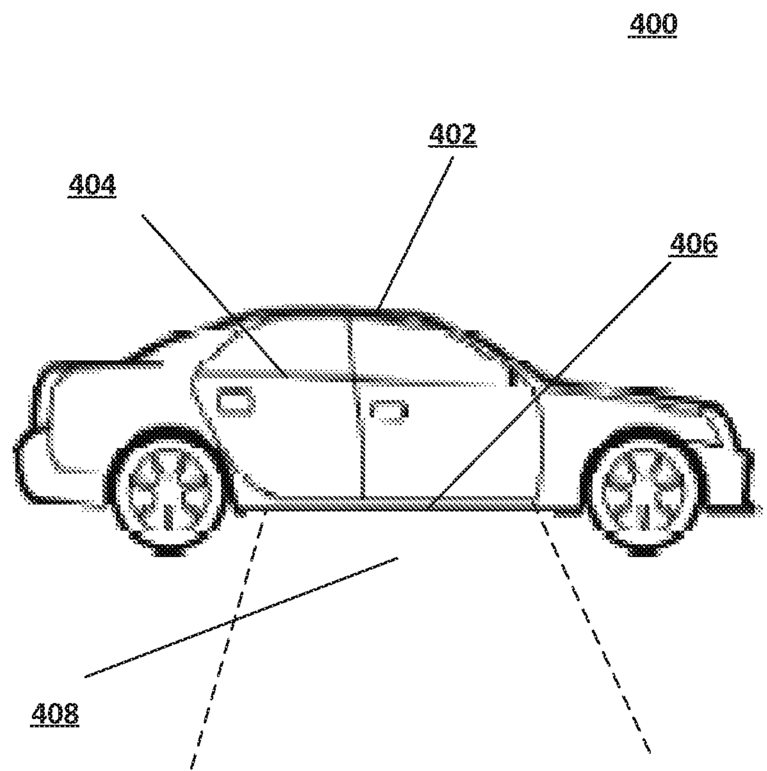

FIG. **5*a*** is a flow chart illustrating the pickup flow for a passenger of the autonomous vehicle, in accordance with various embodiments;

FIG. **5*b*** is a flow chart illustrating the operation of the LED lighting system during the pickup flow for a passenger of the autonomous vehicle, in accordance with various embodiments;

FIG. **6*a*** is a flow chart illustrating the drop-off flow for passenger of the autonomous vehicle, in accordance with various embodiments;

FIG. **6*b* is a flow chart illustrating the operation of the LED lighting system during the drop-off flow for a passenger of the autonomous vehicle, in accordance with various embodiments; and FIG. 7** shows a diagram of the location of the LED lighting system on a vehicle, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation:

application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, some techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
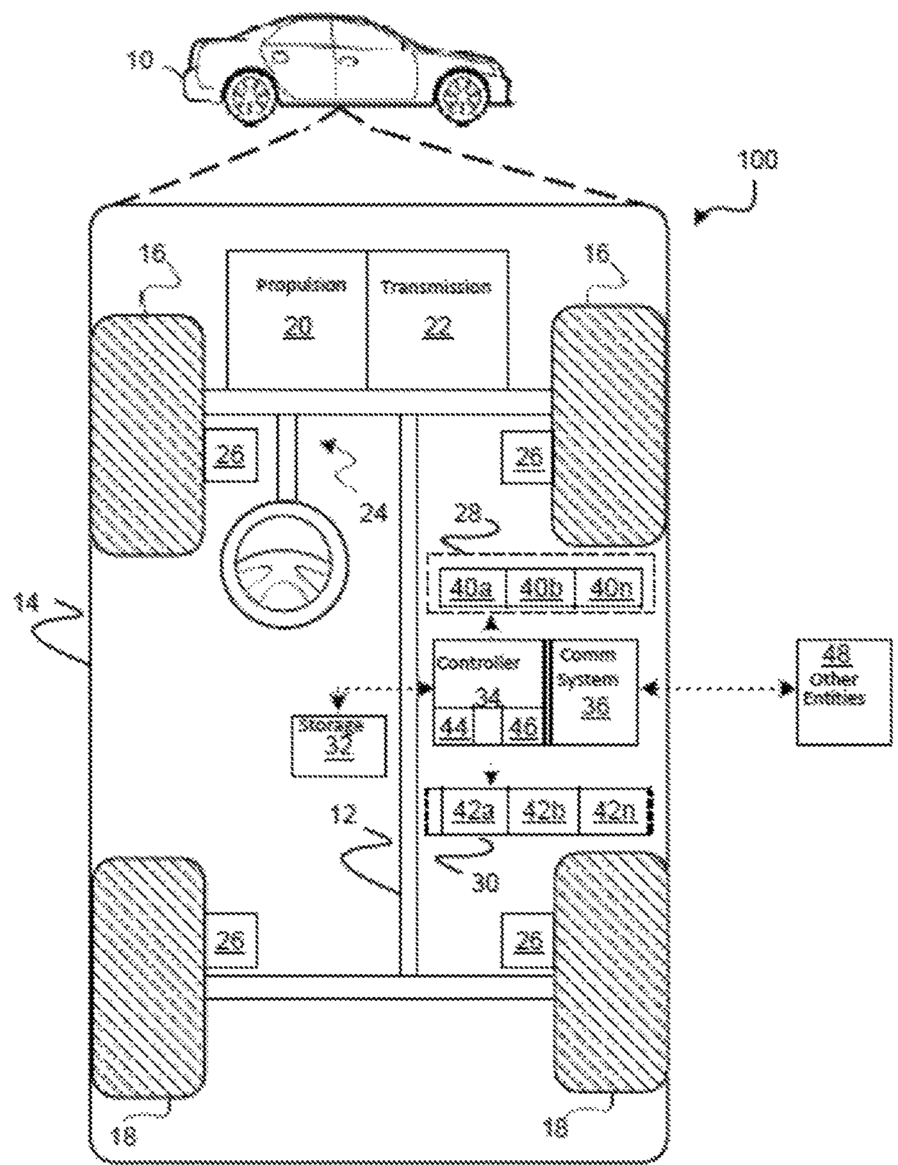
FIG. 1 is a functional block diagram illustrating an autonomous vehicle having a passenger management system, in accordance with various embodiments.

With reference to FIG. 1, a passenger management system shown generally at 100 is associated with a vehicle 10 in accordance with various embodiments. In general, the passenger management system 100 determines that a passenger is approaching the vehicle, using the vehicle, or leaving the vehicle and intelligently controls the passenger interfaces with the vehicle 10 based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the passenger management system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices **40*a*-40*n* that sense observable conditions of the exterior environment and/or the interior environment of the autonomous vehicle 10. The sensing devices 40*a*-40*n* can include, but are not limited to, radars, LIDARs, global positioning systems, optical cameras, thermal cameras, ultrasonic sensors, and/or other sensors. The actuator system 30 includes one or more actuator devices 42*a*-42*n* that control one or more vehicle features such as, but not limited to, the propulsion system 20, the transmission system 22, the steering system 24, and the brake system 26**. In various embodiments, the vehicle features can further include interior and/or exterior vehicle features such as, but are not limited to, doors, a trunk, and cabin features such as air, music, lighting, etc. (not numbered).

Figure 2:
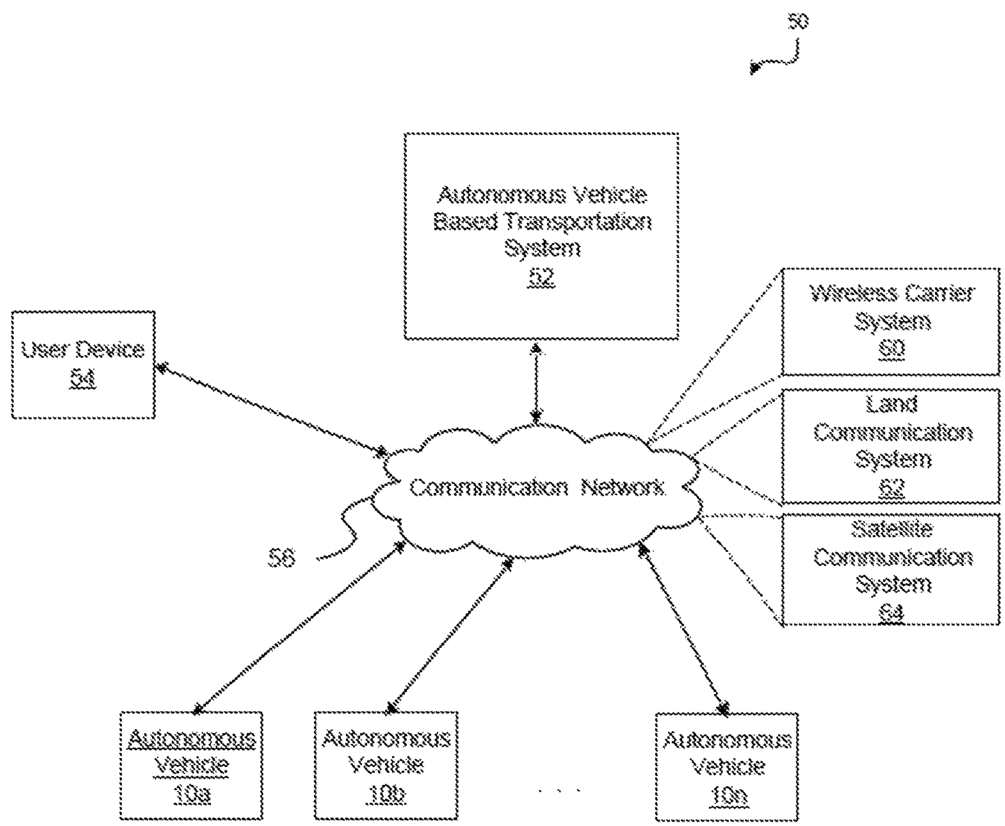
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a microprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the passenger management system 100 and, when executed by the processor 44, manage the interaction between the passenger and the autonomous vehicle through various interfaces. Such passenger vehicle interfaces may include: lighting on either the exterior or interior of the autonomous vehicle; audio messages for the passenger within the vehicle; video messages for the passenger within the vehicle; tactile messages for the passenger within the vehicle; and messages on the passenger's mobile device which may include text, audio or video.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10*a*-10*n* as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide unidirectional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
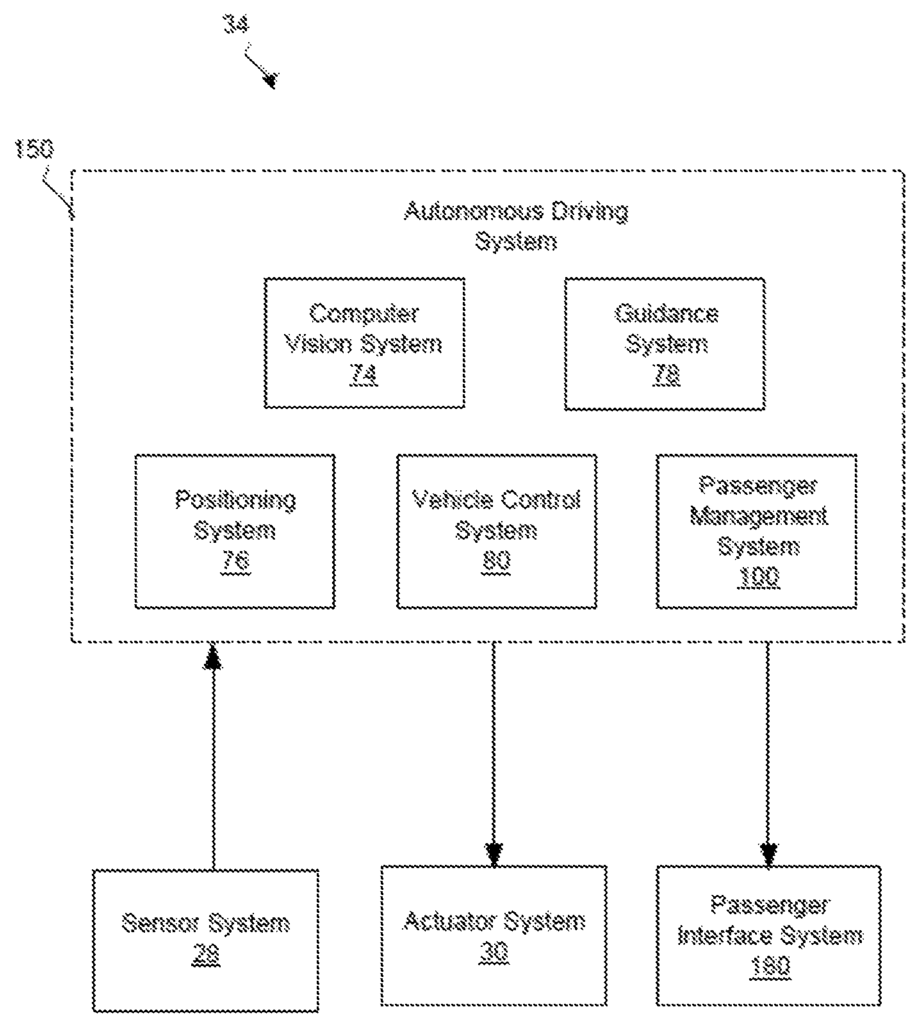
FIG. 3 is a flow chart illustrating an autonomous driving system that of the autonomous vehicle, in accordance with various embodiments.

Referring now to FIG. 3, and with continued reference to FIG. 1, a dataflow diagram illustrates various embodiments of an autonomous driving system (ADS) 70 which may be embedded within the controller 34 and which may include parts of the object classification system 100 in accordance with various embodiments. That is, suitable software and/or hardware components of controller 34 (e.g., processor 44 and computer-readable storage device 46) are utilized to provide an autonomous driving system 70 that is used in conjunction with vehicle 10.

Inputs to the autonomous driving system 70 may be received from the sensor system 28, received from other control modules (not shown) associated with the autonomous vehicle 10, received from the communication system 36, and/or determined/modeled by other sub-modules (not shown) within the controller 34. In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as obstruction mitigation, route traversal, mapping, sensor integration, ground-truth determination, and feature detection, and object classification as discussed herein.

As mentioned briefly above, the passenger management system 100 of FIG. 1 is included within the autonomous driving system 150. For example, the system provides a passenger using an autonomous vehicle with a more meaningful and positive experience by providing feedback on the way to the vehicle, upon meeting the vehicle, in various points of the ride, upon preparing to exit the vehicle, and finally when exiting the vehicle.

The passenger management system is intended for use with a wide variety of autonomous vehicles. These include taxis, rental cars, buses, and other types of public and private autonomous vehicles used by a passenger. The passenger management system interfaces with the passenger over three broad stages of use: moving to and entering the vehicle; during the ride and preparing to exit the vehicle; and exiting the vehicle. Some embodiments may even customize the user's interactions with the vehicle based upon the user's persona and personal preferences.

Figure 4:
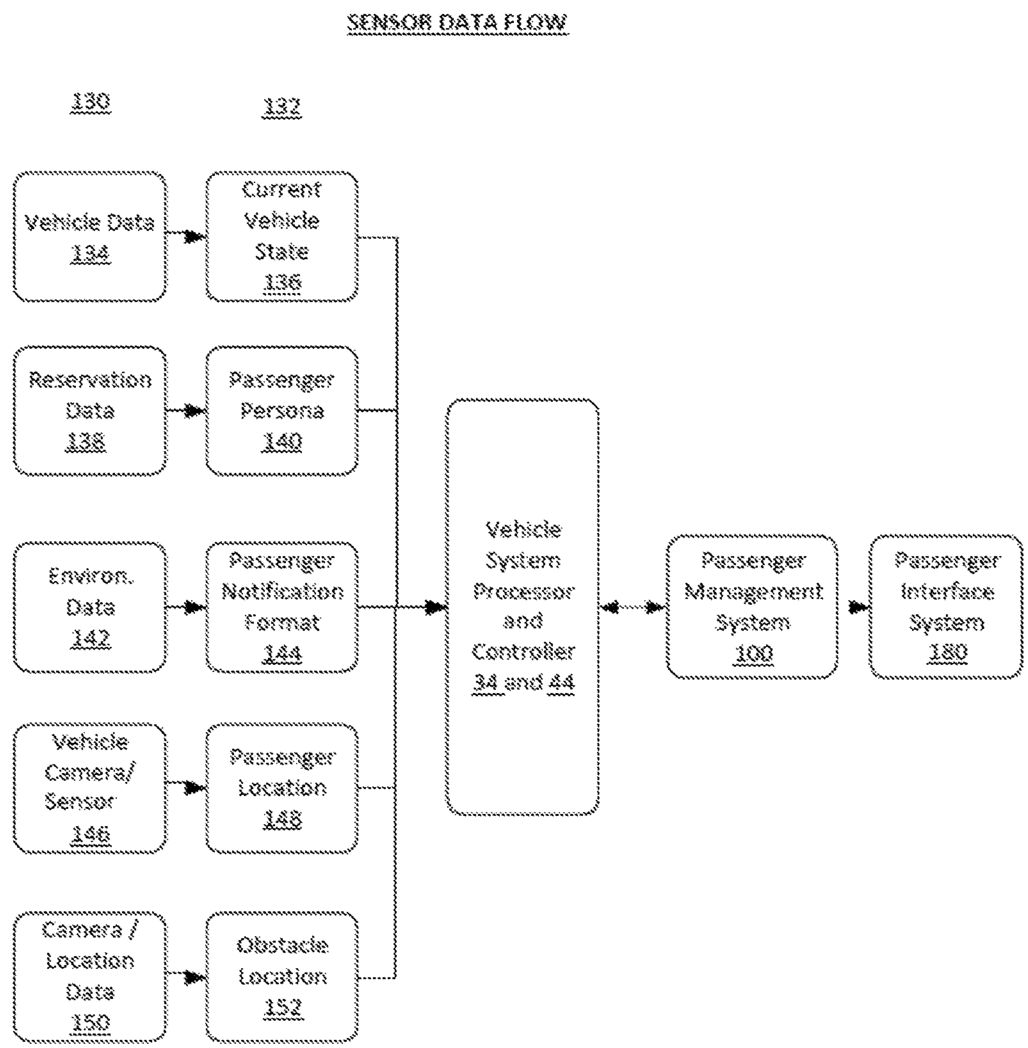
FIG. 4 is a functional block diagram illustrating the sensor data flow of a passenger management system for an autonomous vehicle, in accordance with various embodiments.

As shown in detail with regard to FIG. 4, a data flow diagram shows the sensor data flow of an example embodiment. The sensor system 28 (shown in FIGS. 1 and 3) collects and analyzes different types of data 130 to determine critical information 132 about the passenger and the surrounding environment. The critical information 132 is collected by the vehicle system processor and controller 34 and 44 and passed to the passenger management system 100. The passenger management system 100 analyzes the critical information 132 and determines the optimum interaction with the passenger. The passenger management system 100 controls the passenger interface system 180 that instructs the passenger. The passenger management system 100 also provides instructions concerning passenger interaction to the vehicle system processor and controller 34 and 44 to control the actions of the autonomous vehicle 10 accordingly.

With regards to the data 130 collected by the sensor system 28, vehicle data at 134 determines the current vehicle state at 136. For example, this data determines if the vehicle is available for pairing with a passenger. Reservation data at 138 determines a passenger's persona at 140. The passenger's persona adjusts the passenger's experience with the autonomous vehicle. Environmental data at 142 determines the appropriate passenger notification format at 144. For example, a nighttime reservation requires enhanced lighting for recognition by the passenger as well as obstacle illumination. The vehicle camera and sensor at 146 determines the passenger location at 148 with respect to the vehicle. The vehicle camera and location data from an online navigation database at 150 identifies the location of any obstacles at 152 to exiting the vehicle. Each of these pieces of critical information 132 feeds into the vehicle system processor and controller 34 and 44. The passenger management system 100 receives the information from the processor and controller 34 and 44 and adjusts the passenger's experience with the autonomous vehicle using the passenger interface system 180 and the vehicle system processor and controller 34 and 44.

In other embodiments, the passenger management system 100 identifies a specific persona of the passenger and adjusts the appearance of the lighting and sound of the vehicle 10 accordingly. Different personas are identified by previous reservation requests, day and time of the reservation, the destination of the passenger, and the appearance of the passenger, or other similar indicators. For example, a business person is assigned a no-nonsense persona. Such a passenger is typically in a hurry and speed to the destination is a priority. In contrast, a tourist is assigned a curious and excited persona. Such a passenger is directed along scenic routes and speed is not a priority. Another example would be a group of young people going out for an evening of entertainment. They are assigned a young and funky persona. Such a group of passengers will experience light and dynamic interaction with the autonomous vehicle.

Figure 5A:
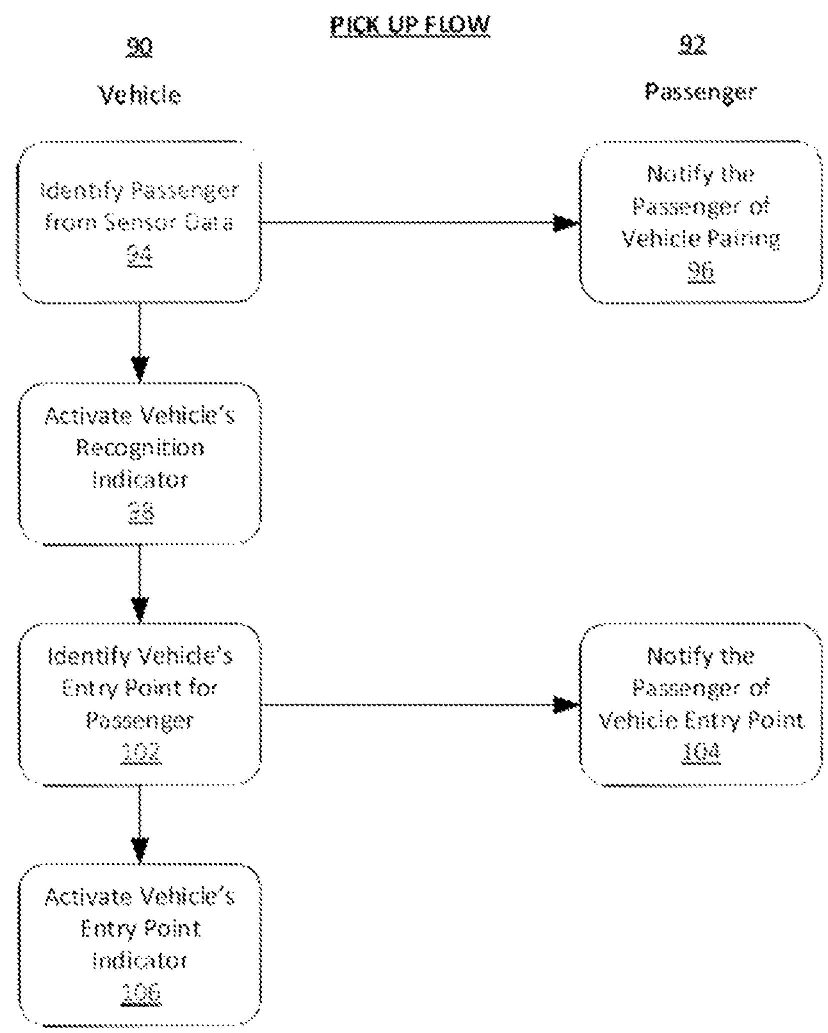

As shown in detail with regard to FIG. 5*a* and with continued reference to FIGS. 1-3, a flowchart illustrates a pickup flow for the passenger 92 approaching and entering an autonomous vehicle 90 in accordance with various embodiments. As the passenger approaches the vehicle 10, signals received from sensors 28 on board the vehicle 10 are used to identify the passenger 94. The sensors may include: a 3-D camera; an ultra-wide band (UWB) sensor; a global positioning system (GPS) receiver; or other suitable wireless-based unique identifiers. For example, the GPS receiver provides the location of the vehicle 10 in relation to the passenger's location as indicated by location data received from the passenger's mobile device. Once the passenger is close enough to be in view by the sensors 28, the system 100 identifies and locates the passenger using data from the UWB sensor paired with the 3-D camera.

The system 100 notifies the passenger of being paired with the approaching vehicle 10 at 96. The passenger may be notified via a mobile communication device such as a smart phone, mobile tablet or other suitable device and are in the form of a text message, an email, an audio message, a video message, a tactile notification such as a vibration, or other suitable formats. In other examples, the notification is through a dedicated application ("app") on the passenger's mobile communication device, a website, email, text, voice message, or other suitable forms of communication.

Upon identification of the passenger at 94 and notification to the passenger at 96, the system 100 activates the recognition indicator for the passenger at 98. The recognition indicator allows the passenger to identify the vehicle at a short distance. In some examples, the recognition indicator will be a light emitting diodes (LED) lighting system mounted on the vehicle. The LED system may be color coordinated to identify the specific paired vehicle for the passenger. Additionally, the LED recognition signal may be lighting along the roof of the vehicle for ease of identification at a distance. As the passenger gets closer to the vehicle, the LED lighting may shift to the edges of the doors or even along the bottom of the vehicle that functions as an extra projection system for the exit path of the vehicle. It should be understood that various combinations of location, illumination pattern and color of the lighting may be used as a recognition signal. The system 100 the location and pattern of the LED recognition signal on the vehicle 10 based on factors such as the passenger's distance from the vehicle, other vehicular and pedestrian traffic present, visibility conditions, etc. For example, if the sensors 28 detect rainfall, at night on a crowded street as the passenger gets close to the vehicle 10, the system 100 selects bright LED lighting along the roof of the vehicle 10 for easiest recognition.

In other embodiments, the system 100 may actually project the user's physical identity onto the vehicle itself. The user thus clearly and unambiguously identifies the paired vehicle in case more than one similar vehicle arrives at the designated meeting point. The projected identity on the vehicle could be in the form of the user's name, the user's image (e.g., picture, silhouette, visual contours), or both.

As the passenger recognizes the vehicle and approaches, the vehicle identifies an entry point for the passenger at 102. An example of an entry point may be the vehicle door closest to the passenger that provides a safe entry. By default, the system 100 selects an entry point closest to the passenger. However, the sensors 28 search the area around the entry point for obstacles, traffic and other potential hazards to the passenger. If obstacles are detected, the system 100 selects an alternative entry point for passenger safety. The system 100 notifies the passenger of the designated entry point at 104. The notification is a message sent to the passenger's mobile device. Substantially simultaneously, the system 100 activates a recognition indicator at or near the entry point of the vehicle at 106 as the passenger arrives at the vehicle. In one example, the vehicle will signal mutual recognition with the passenger by generating a "click" sound or other sound that simulates a door unlocking. Upon entry by the passenger indicated by closing the door, the system 100 generates a second "click" sound or other sound to indicate locking the door and the beginning of the ride. These audio sounds may be generated by both the interior or exterior sound system of the vehicle and the passenger's mobile device.

Once the passenger is inside the vehicle 10, a passenger interface system 180 controls communication between the passenger and the passenger management system 100. In various embodiments, the passenger interface system 180 communicates with the passenger via audio sounds, visual signals, or tactile indicators generated inside the vehicle 10. Examples of these types of communications with the passenger include: sound; light; video; text; vibration; or other suitable sensory stimuli.

Figure 5B:
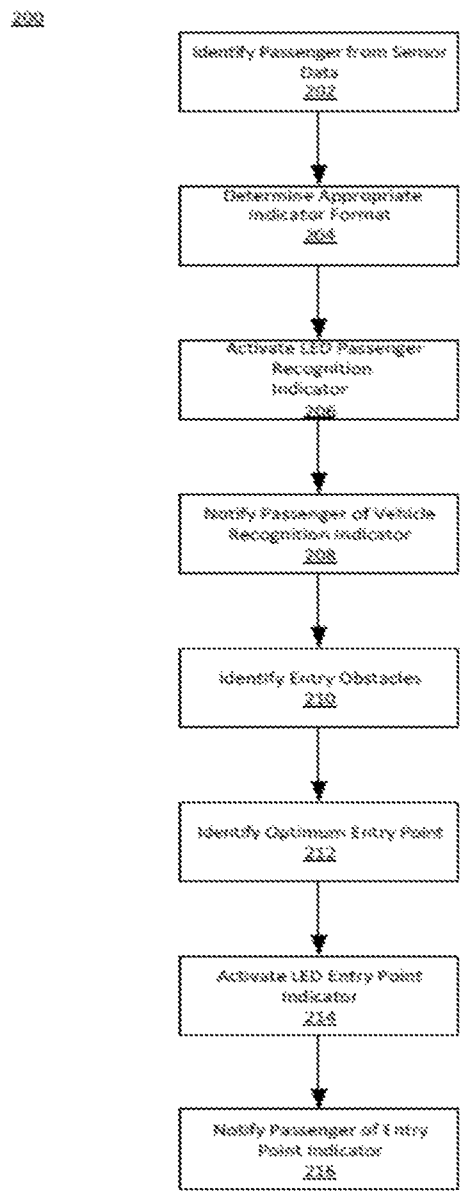

As shown in detail with regard to FIG. 5*b* and with continued reference to FIGS. 4 and 5*a*, a flow chart illustrates the detail of the operation of the LED lighting system 200 during the pickup flow for a passenger of the autonomous vehicle in accordance with various embodiments. Once the passenger is identified from the sensor data 202, the system determines an appropriate indicator format for the LED lighting system 204 on the exterior of the vehicle. An appropriate indicator format should provide easy of the location of the autonomous vehicle recognition by the passenger. The appropriate format depends upon such factors as traffic, crowds, weather, streetlighting, time of day, and any other factors affecting visibility. For example, a crowded street with large amount of vehicular and pedestrian traffic may require a recognition indicator located along the top of the vehicle. If other autonomous vehicles with recognition indicators are present (e.g., a taxi line), each autonomous vehicle may use a unique recognition indicator. For example, the LED lighting system may use different colors or lighting patterns to make recognition of the individual vehicle easier. In other embodiments, portions of the LED lighting system may be blinking or lighted at different brightness levels.

Once the appropriate recognition indicator format is determined, the autonomous vehicle will activate the LED passenger recognition indicator 206. The passenger is notified of the recognition indicator by the passenger management system 208. As the autonomous vehicle stops, the vehicle sensors will identify any entry obstacles to the vehicle 210. Examples of such obstacles may include heavy traffic, sidewalk or street barricades, construction, potholes, snowbanks, ice or any other impediments to entry. If any obstacles are identified, the vehicle will identify the optimum entry point which will avoid the obstacle if possible 212. If no obstacles are identified, the optimum entry point will typically be the vehicular door closest to the passenger's location. Once the optimum entry point is identified, the vehicle will activate and LED entry point indicator 214. The entry point indicator will typically be an LED light along the edge of the door designated for the entry. The passenger is notified of the LED entry point indicator by the passenger management system 216.

Figure 6A:
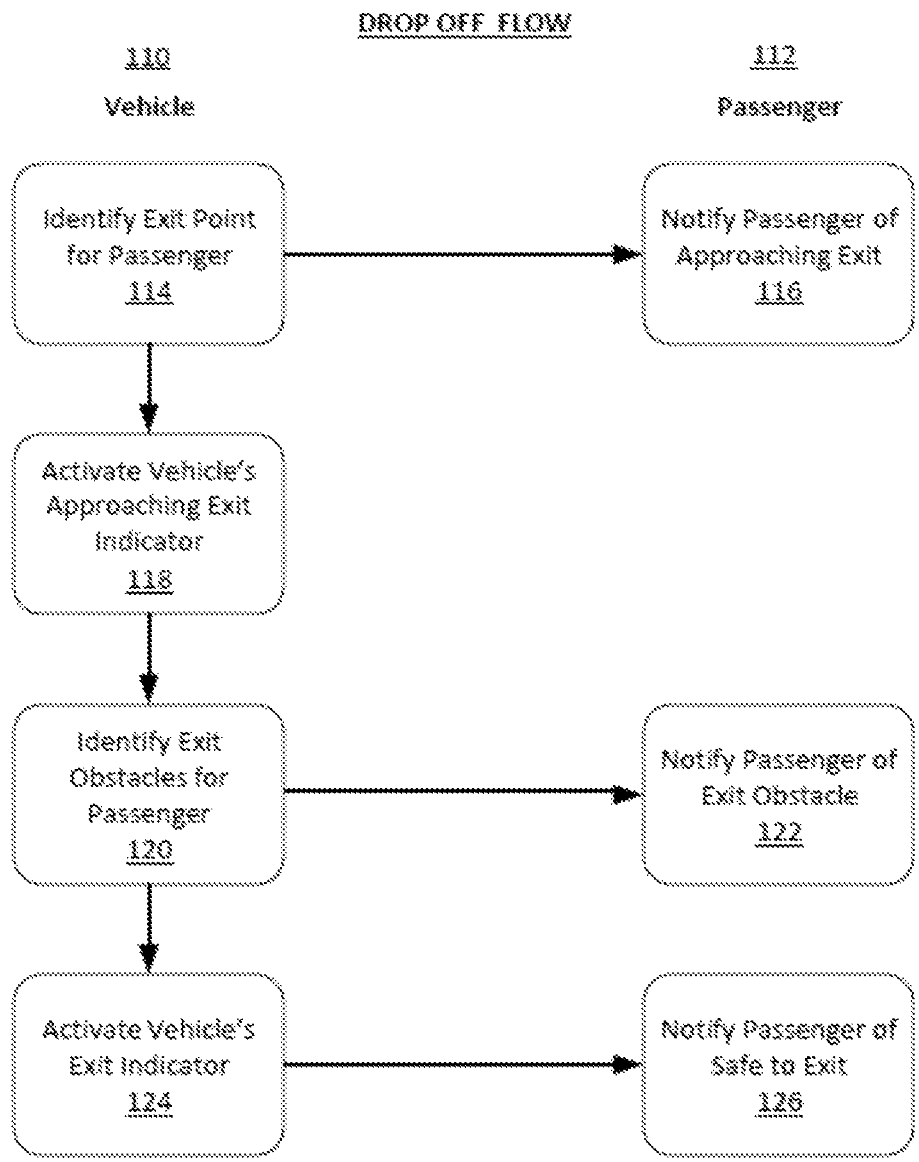

As shown in detail with regard to FIG. 6*a*, a flowchart illustrates the drop-off flow for the passenger 112 leaving the autonomous vehicle 110 in accordance with various embodiments. As the ride progresses, the system 100 identifies an exit point for the passenger at 114. Substantially simultaneously, the system 100 notifies the passenger of the approaching exit point at 116. In some embodiments, notification is through the passenger's mobile device, the internal audio or video system of the vehicle, or a combination of these. As the vehicle 10 approaches the exit point, the system 100 activates the approaching exit indicator at 118. Once the vehicle 10 is near the exit point, the sensors 28 identifies any exit obstacles for the passenger 120. Additionally, the system 100 identifies any exit obstacles via online navigation databases. If any obstacles are present, the system 100 notifies the passenger of their location 122. Additionally, the system 100 activates a recognition signal for the location of the exit obstacle. In some embodiments, the recognition signal is an illumination of the exit obstacle utilizing the onboard LED lighting system. For example, the vehicle may illuminate a curb adjacent to the exit door of the vehicle.

Once the vehicle is stopped, the system 100 identifies the exit door for the passenger and activates the exit indicator at 124. The exit indicator may be a "click" sound or other sound for indicating the unlocking of the exit door. The system 100 notifies the passenger that it is safe to exit the vehicle 126. When the passenger has safely exited the vehicle 10 and the door is closed, full control of the autonomous vehicle 10 returns to the passenger management system 100 for pairing of the vehicle with the next passenger.

Figure 6B:
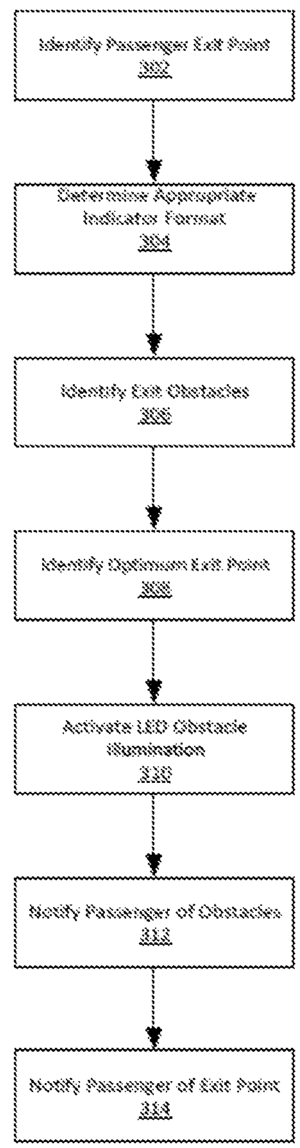

As shown in detail with regard to FIG. 6*b* and with continued reference to FIGS. 4 and 6*a*, a flow chart illustrates the detail of the operation of the LED lighting system 300 during the drop off flow for a passenger of the autonomous vehicle in accordance with various embodiments. As the passenger's ride concludes, the vehicle will identify an exit point for the passenger 302 to exit the vehicle. As with the pickup flow described previously with reference to FIG. 5*b*, the system determines an appropriate indicator format for the LED lighting system 304. An appropriate indicator should clearly indicate to the passenger which door should be used to exit the vehicle.

As the vehicle stops, the vehicle sensors will identify any exit obstacles to the vehicle 306. Examples of such obstacles may include heavy traffic, sidewalk or street barricades, construction, potholes, snowbanks, ice or any other impediments to exit. If any obstacles are identified, the vehicle will identify the optimum exit point which will avoid the obstacle if possible 308. If avoidance is not possible, the vehicle will activate the LED lighting system to illuminate the obstacle 310. For example, if a passenger was exiting the vehicle at night, the vehicle would illuminate LED lighting along the bottom edge of the vehicle in order to alert the passenger to such obstacles as curbs or potholes. Additionally, the passenger management system will notify the passenger of such obstacles 312. The passenger may be notified via their mobile device, an audio message, a video message, or other suitable formats in accordance with various embodiments. After illuminating any obstacle and notifying the passenger, the vehicle will notify the passenger of the optimum exit point 314 and the passenger will exit the vehicle.

As shown in detail with regard to FIG. 7, a diagram illustrates the location of the LED lighting system on a vehicle 400, in accordance with various embodiments. LED lighting may be located along the top edge of the vehicle 402, along the middle of the doors just below the window 404, or along the bottom manage of the vehicle 406. The lighting may vary in colors and brightness to allow the vehicle a distinctive recognition pattern. For example, the vehicle may illuminate its top edge 402 with blinking green lights attract a passenger's attention on a crowded street. It should be understood that many combinations of colors, brightness and flashing patterns may be used. Additionally, the LED lighting along the bottom edge of the vehicle 406 may function as an external projection system for the passenger upon exiting the vehicle. The external projection system will illuminate the exit path 408 and any obstacles for the passenger.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A method for managing a passenger's interaction with an autonomous vehicle, comprising:

identifying the passenger prior to entering the autonomous vehicle, where the passenger is identified with a sensor onboard the autonomous vehicle;

determining an appropriate recognition indicator for an external LED lighting system to identify the autonomous vehicle for the passenger;

selecting an optimum vehicle entry point for the passenger based on the presence of any entry obstacles for the passenger, where an entry obstacles is located in proximity to the vehicle such that the entry obstacle is an impediment to the passenger entering the vehicle;

selecting an optimum vehicle exit point for the passenger based on the presence of an exit obstacle for the passenger, where the exit obstacle is located in proximity to the vehicle such that the exit obstacle is an impediment to the passenger exiting the vehicle; and illuminating the exit obstacle with the external LED lighting system for the passenger upon exiting the vehicle.

2. The method of claim 1, where the appropriate recognition indicator is selected based on conditions affecting visibility for the passenger.

3. The method of claim 1, where the external LED lighting system is located along the top of the autonomous vehicle.

4. The method of claim 1, where the external LED lighting system is located along the door of the autonomous vehicle.

5. The method of claim 1, where the external LED lighting system is located along the bottom of the autonomous vehicle.

6. The method of claim 1, where the external LED lighting system utilizes multiple colors of lighting as an appropriate recognition indicator.

7. The method of claim 1, where the external LED lighting system utilizes variable brightness of lighting as an appropriate recognition indicator.

8. The method of claim 1, where the external LED lighting system utilizes multiple locations of lighting on the autonomous vehicle as an appropriate recognition indicator.

9. The method of claim 1, where the external LED lighting system utilizes flashing of lighting on the autonomous vehicle as an appropriate recognition indicator.

10. The method of claim 1, where the sensor comprises a 3-D camera.

11. The method of claim 1, where the sensor comprises an ultra-wide band (UWB) sensor.

12. The method of claim 1, where the sensor comprises a global positioning system (GPS) receiver.

13. A system for managing a passenger's interactions with an autonomous vehicle, comprising:

an autonomous driving system for the autonomous vehicle comprising a vehicle system processor and controller;

a plurality of sensors that collect data regarding the passenger prior to entering the autonomous vehicle, where the data is provided to the vehicle system's processor and controller;

a passenger management system that receives the data from the vehicle system processor and controller, where the passenger management system analyzes the data and determines an optimum entry point and optimum exit point from the autonomous vehicle by the passenger, where the optimum entry point and the optimum exit point are determined based on the proximity of any obstacles to the autonomous vehicle such that the obstacles are an impediment to the passenger entering or exiting the vehicle; and a passenger interface system that receives instructions from the passenger management system and initiates communications with the passenger.

14. The system of claim 13, where the vehicle system processor and controller receives instructions from the passenger management system to control the autonomous vehicle's interaction with the passenger.

15. The system of claim 13, where the autonomous vehicle comprises a rental car.

16. The system of claim 13, where the autonomous vehicle comprises a bus.

17. The system of claim 13, where the autonomous vehicle comprises a taxi.

18. A method for managing a passenger's interaction with an autonomous taxi, comprising:

receiving a request at an autonomous vehicle transportation system for a taxi;

pairing a taxi with the passenger with the autonomous vehicle transportation system;

dispatching the taxi to the passenger's pick-up location with the autonomous vehicle transportation system;

notifying the passenger via a mobile device as the taxi approaches the passenger's pick-up location;

identifying the passenger prior to entering the taxi, where the passenger is identified with a global positioning system (GPS), a 3D camera and an ultra-wide band (UWB) sensor onboard the taxi;

activating an external LED light on the taxi as a recognition signal for the passenger;

selecting and unlocking an entry door on the taxi for the passenger;

activating an external LED light on the taxi door as a recognition signal for the passenger to enter the taxi;

notifying the passenger as the taxi approaches the passenger's drop-off location;

identifying exit obstacles for the passenger with the 3-D camera and the ultra-wide ban (UWB) sensor, where the exit obstacle is located in proximity to the taxi such that the exit obstacle is an impediment to the passenger exiting the taxi;

notifying the passenger via a mobile device of the location of exit obstacles from the taxi;

activating an external LED light on the taxi to illuminate exit obstacles for the passenger;

selecting and unlocking an exit door on the taxi for the passenger;

notifying the passenger of the exit door on the taxi; and notifying the passenger that it is safe to exit the taxi.

19. The method of claim 18, further comprising identifying the passenger's persona based on the request received at an autonomous vehicle transportation system for a taxi.

20. The method of claim 19, further comprising adjusting the type of notifications to the passenger based upon the passenger's persona.

* * * * *